(12) United States Patent
Zhao et al.

(10) Patent No.: US 7,789,439 B2
(45) Date of Patent: *Sep. 7, 2010

(54) BATTERY COVER LATCH MECHANISM AND PORTABLE ELECTRONIC DEVICE USING SAME

(75) Inventors: Xiang-Guo Zhao, Shenzhen (CN); Chih-Chiang Chang, Taipei Hsien (TW); Zhi Li, Shenzhen (CN); Si-Quan Chen, Shenzhen (CN); Zhi-Yun Shen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 12/255,727

(22) Filed: Oct. 22, 2008

(65) Prior Publication Data

US 2009/0303668 A1 Dec. 10, 2009

(30) Foreign Application Priority Data

Jun. 4, 2008 (CN) .................... 2008 1 0301975

(51) Int. Cl.
*E05C 1/08* (2006.01)
*E05C 1/06* (2006.01)
(52) U.S. Cl. .............. 292/163; 292/137; 292/140; 292/145; 292/150; 292/302; 292/DIG. 11; 292/DIG. 37

(58) Field of Classification Search ............. 292/137, 292/138, 140, 145, 146, 150, 163, 302, DIG. 11, 292/DIG. 37
See application file for complete search history.

(56) References Cited

U.S. PATENT DOCUMENTS

| 2,648,561 | A | * | 8/1953 | Landon ................. 292/170 |
| 4,685,558 | A | * | 8/1987 | Filiz et al. ............... 206/1.5 |
| 4,799,503 | A | * | 1/1989 | Tahara .................. 220/260 |
| 5,626,374 | A | * | 5/1997 | Kim ..................... 292/170 |
| 5,803,537 | A | * | 9/1998 | Langmeser et al. .... 297/188.19 |
| 7,175,144 | B2 | * | 2/2007 | Yen et al. .............. 248/221.11 |
| 7,410,194 | B2 | * | 8/2008 | Chen et al. ............... 292/37 |
| 7,441,813 | B2 | * | 10/2008 | Qin et al. ................ 292/163 |
| 7,543,862 | B2 | * | 6/2009 | Lin ...................... 292/251.5 |
| 2008/0100068 | A1 | * | 5/2008 | Kim ..................... 292/163 |
| 2009/0096221 | A1 | * | 4/2009 | Jan et al. ................. 292/81 |

* cited by examiner

*Primary Examiner*—Carlos Lugo
(74) *Attorney, Agent, or Firm*—Steven M. Reiss

(57) ABSTRACT

A battery cover latching mechanism used in portable electronic device (10) is described including a cover member (11), a housing member (12), a latch base (14), a latch member (13), and a return member (15). The latch base can be securely attached to the housing member. The latch member is mounted on the latch base and movable relative to the latch base to latch the cover member to the housing member. The return member is compressed when the cover member is latched to the housing member. The cover can be detached from the housing either by a movement of the latch member driven by the return member or by another movement further compressing the return member.

18 Claims, 5 Drawing Sheets

BATTERY COVER LATCH MECHANISM AND PORTABLE ELECTRONIC DEVICE USING SAME

CROSS-REFERENCE TO RELATED APPLICATIONS

This application is related to co-pending U.S. patent application Ser. No. 12/255,725, entitled "BATTERY COVER LATCH MECHANISM AND PORTABLE ELECTRONIC DEVICE USING SAME", by Zhen Shi et al. Such applications have the same assignee as the present application and have been concurrently filed herewith. The above-identified applications are incorporated herein by reference.

BACKGROUND

1. Field of the Invention

The invention relates to battery cover latch mechanisms used in portable electronic device.

2. Description of Related Art

Portable electronic devices usually include latch mechanisms to latch battery covers to housings. The latch mechanisms require frequent installation and removal of batteries relative to the housings.

A typical latch mechanism is used to attach a battery cover to a housing of the portable electronic device. A latch of the latch mechanism includes a pair of hooks at one end of the battery cover and a locking pin protruding from the other end of the battery cover. A pair of grooves and a locking hole are defined in the housing. In assembly, the hooks are inserted into the grooves. The battery cover is pressed downwardly onto the housing until the locking pin is inserted into the locking hole. However, during disassembly, a large force is needed to remove the battery cover from the housing. It is difficult to the install and removal of the battery relative to the housing.

Therefore, there exists room for improvement within the art.

BRIEF DESCRIPTION OF THE DRAWINGS

Many aspects of the exemplary battery cover latch mechanism and a portable electronic device using the battery cover latch mechanism can be better understood with reference to the following drawings. These drawings are not necessarily drawn to scale, the emphasis instead being placed upon clearly illustrating the principles of the exemplary battery cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
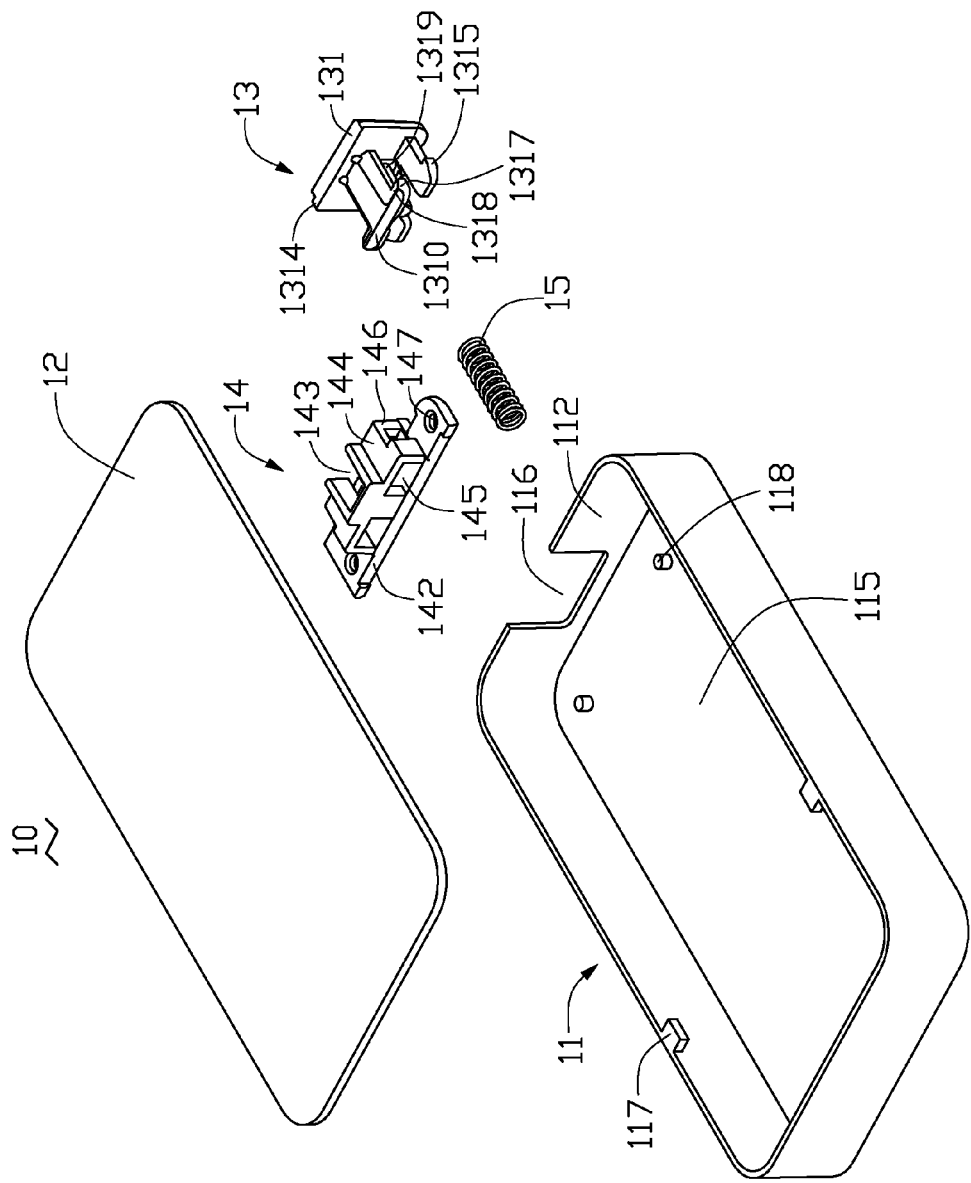
FIG. 1 is an isometric and exploded view of a portable electronic device using a battery cover latching mechanism according to the exemplary embodiment.
Figure 2:
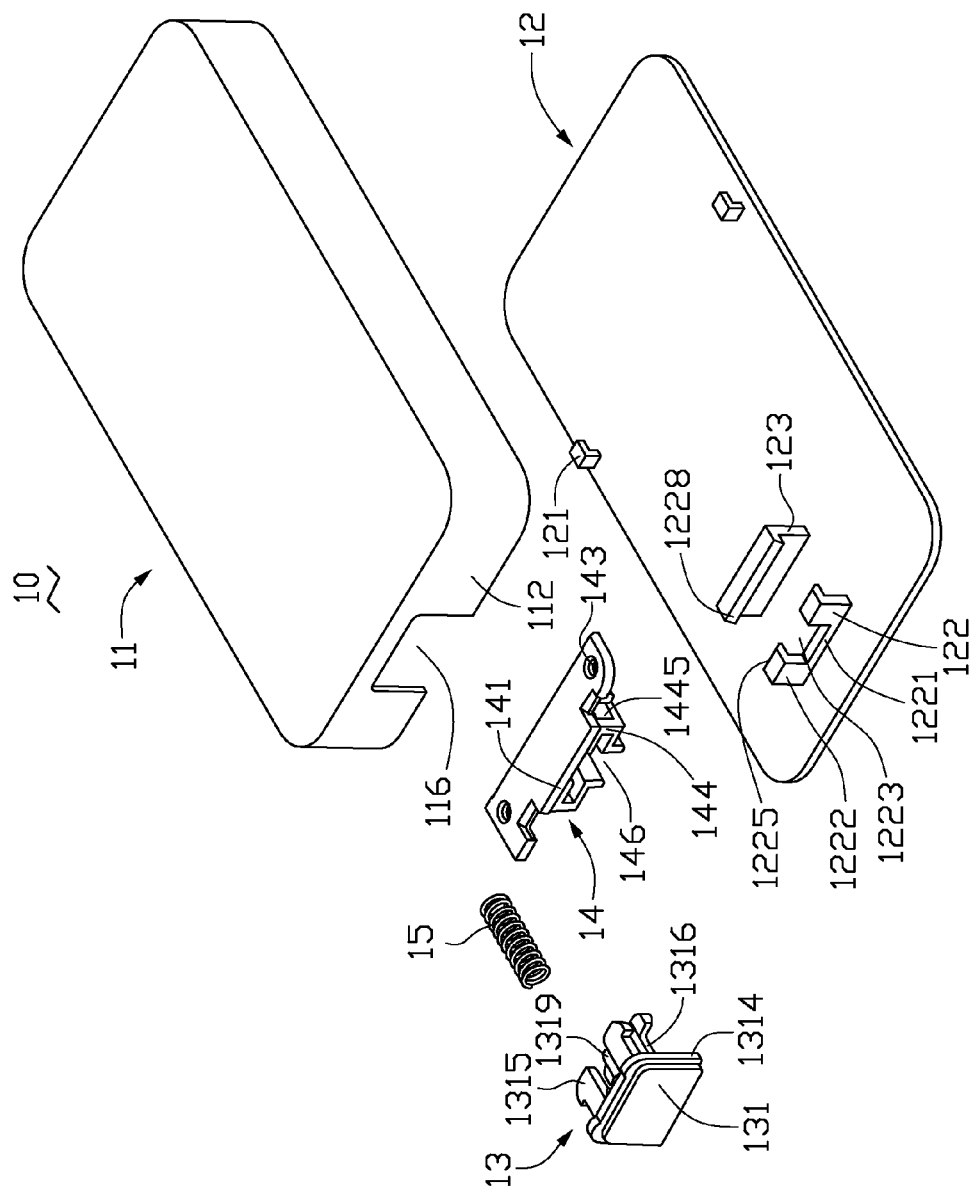
FIG. 2 is similar to FIG. 1, but viewed from anther angle.

Referring to FIGS. 1 and 2, a portable electronic device 10 (such as a mobile phone or personal digital assistant) includes a battery cover latch mechanism (not labeled) including a housing member 11, a cover member 12, a latch member 13, a latch base 14, and a return member 15. The housing member 11 can be a housing of the portable electronic device 10. The cover member 12 can be a cover of the portable electronic device 10. The latch member 13 is configured to be mounted on the latch base 14 and between the housing member 11 and the cover member 12. The latch member 13 latches the cover member 12 to the housing member 11. The return member 15 is used to facilitate the latching of the latch member 13.

The housing member 11 includes a peripheral wall 112 and a bottom wall 115. The peripheral wall 112 and the bottom wall 115 define a cavity (not labeled) therein. The cavity can be used to receive a battery (not shown). One end of the peripheral wall 112 defines a generally rectangular notch 116. Opposite sides of the peripheral wall 112 include retaining blocks 117 spaced above the bottom wall 115. The bottom wall 115 has two attaching columns 118 protruding therefrom. The two attaching columns 118 are adjacent to the notch 116.

Figure 4:
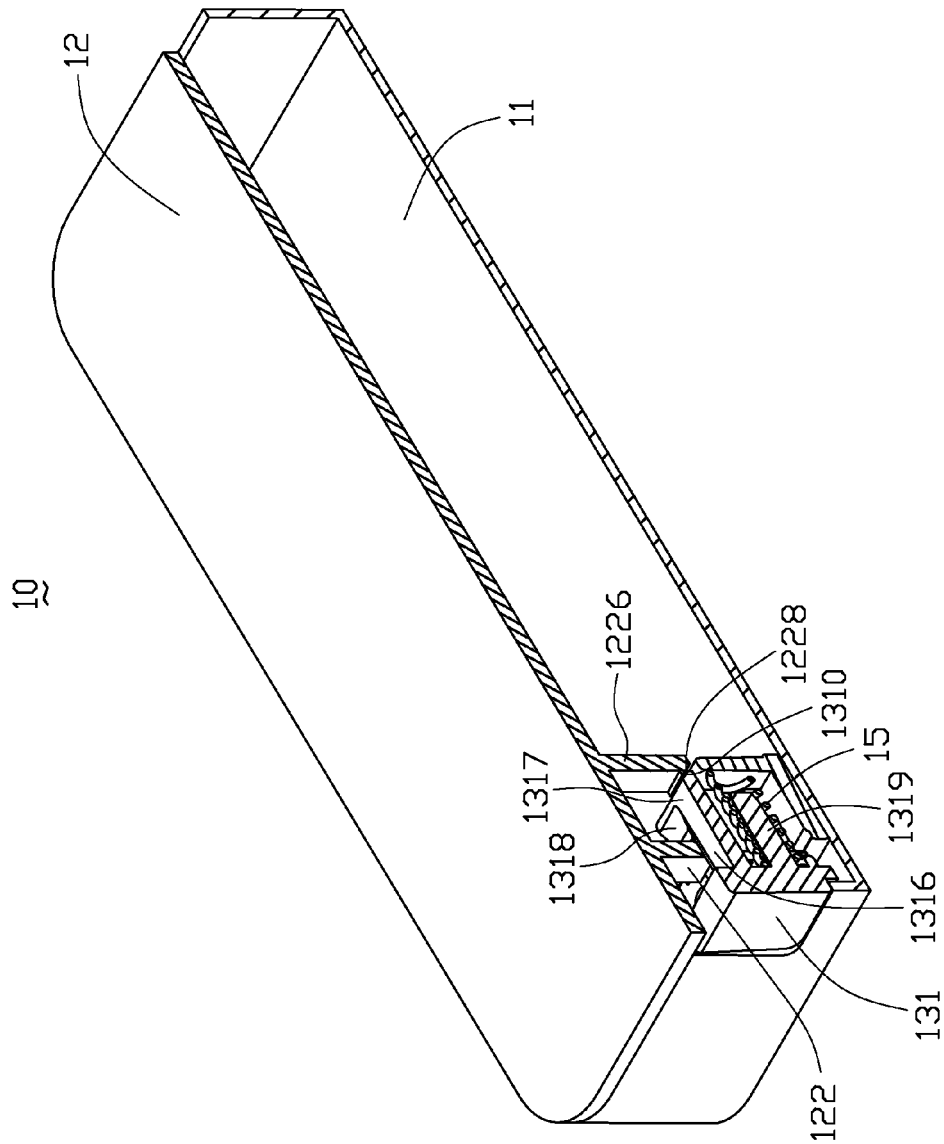
FIG. 4 is a sectional view of the battery cover latching mechanism in FIG. 1 at a latched position.

The cover member 12 is a planar board mating with the peripheral wall 112 to close the cavity of the housing member 11 (best shown in FIG. 4). The inside surface of the cover member 12 includes two protruding retaining portions 121, a first latch portion 122, and a release portion 123. The two retaining portions 121 correspond to the two retaining blocks 117. The two retaining portions 121 are L-shaped and located adjacent to two opposite edges of the cover member 12. The first latch portion 122 includes two latch parts 1222 and a bridge part 1221. Two opposite ends of the bridge part 1221 connect the two latch parts 1222 respectively. The latch parts 1222 and the bridge part 1221 cooperatively define a receive cavity 1223 in them. The two latch parts 1222 are generally L-shaped with a first inclined wall 1225 on a distal end to the surface of the cover member 12.

The release portion 123 is generally L-shaped with a third inclined wall 1228 on a distal end to the surface of the cover member 12. The release portion 123 is adjacent to the first latch portion 122. The third inclined wall 1228 is opposite to the first inclined wall 1225.

The latch member 13 includes a generally step-shaped press portion 131, two clasp portions 1315, a second latch portion 1316, and a position portion 1319. The two clasp portions 1315, a second latch portion 1316, and a position portion 1319 protrude from the same side of the press portion 131. The two clasp portions 1315 are oppositely arranged and the position portion 1319 is located between the second latch portion 1316 and the two clasp portions 1315.

The press portion 131 is configured to be received and slide within the notch 116. The press portion 131 has two step parts 1314 to prevent the latch member 13 from leaving the notch 116. The two clasp portions 1315 are elastic and generally shaped like "L". The second latch portion 1316 is generally T-shaped and includes a latch end 1317 distal to the press portion 131. The latch end 1317 has two second inclined walls 1318 facing the press portion 131 and a fourth inclined wall 1310 opposite to the second inclined walls 1318. The second inclined walls 1318 correspond to the first inclined wall 1225. The second inclined walls 1318 is configured for sliding along the first inclined wall 1225. The fourth inclined wall 1310 corresponds to the third inclined wall 1228 and is configured for sliding along the third inclined wall 1228.

The latch base 14 is generally a T-shaped block and has a base 142 and a protruding block 144. The base 142 defines two securing holes 147 besides two opposite ends of the protruding block 144. The latch base 14 can be securely attached to the bottom wall 115 by a securing (e.g., hot melting) of the attaching columns 118 within the securing holes 147. The protruding block 144 defines two clasp holes 145 and a blind hole 143. The blind hole 143 is positioned between the two clasp holes 145. The clasp holes 145 are defined to form two clasp walls 146 on the corners of the protruding block 144. The two clasp walls 146 correspond to the two clasp portions 1315.

The return member 15 is configured to return the latch member 13 from its released position to its latched position. The return member 15 is a coil spring and configured for coiling around the position portion 1319 and being received in the blind hole 143.

Figure 3:
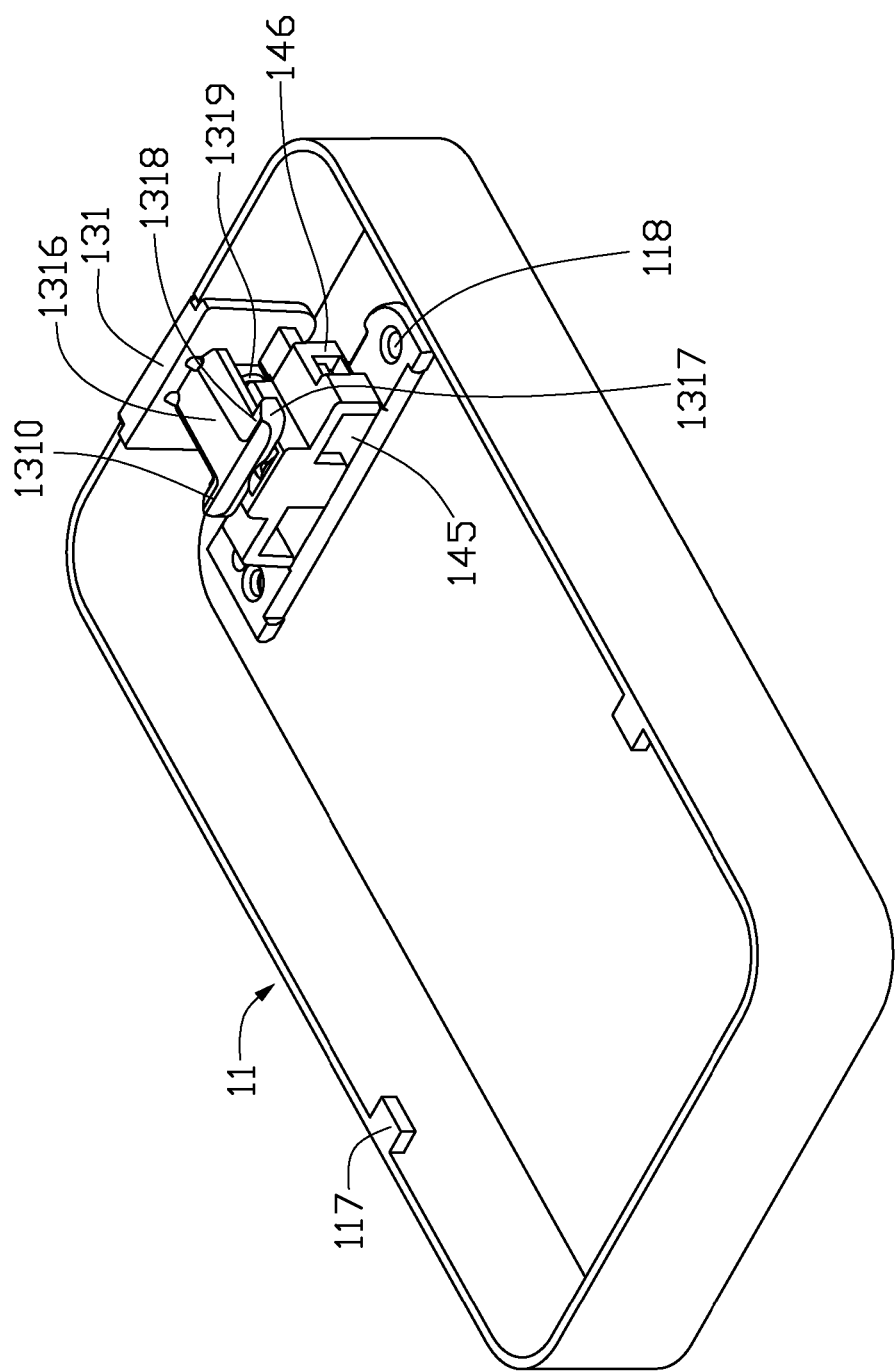
FIG. 3 is an assembled view of a housing member, a latch member and a return member shown in FIG. 1.

Referring also to FIG. 3, the latch base 14 is securely attached to the bottom wall 115. The latch member 13 is latched within the cavity of the housing member 11 by the clasping of the clasp portions 1315 to the clasp walls 146 and the resisting of the edges of the notch 136 against the step parts 1314 return member 15 coils around the position portion 1319 and is received in the blind hole 143. The return member 15 is compressed between the bottom wall of the blind hole 143 and the press portion 131.

Referring to FIG. 4, the battery cover latch mechanism is at a latched position. The cover member 12 is latched to the housing member 11 by the latching of the latch end 1317 with the first latch portion 122 and the retaining of the retaining blocks 117 and the retaining portions 121. The latch member 13 is at the latched position.

Figure 5:
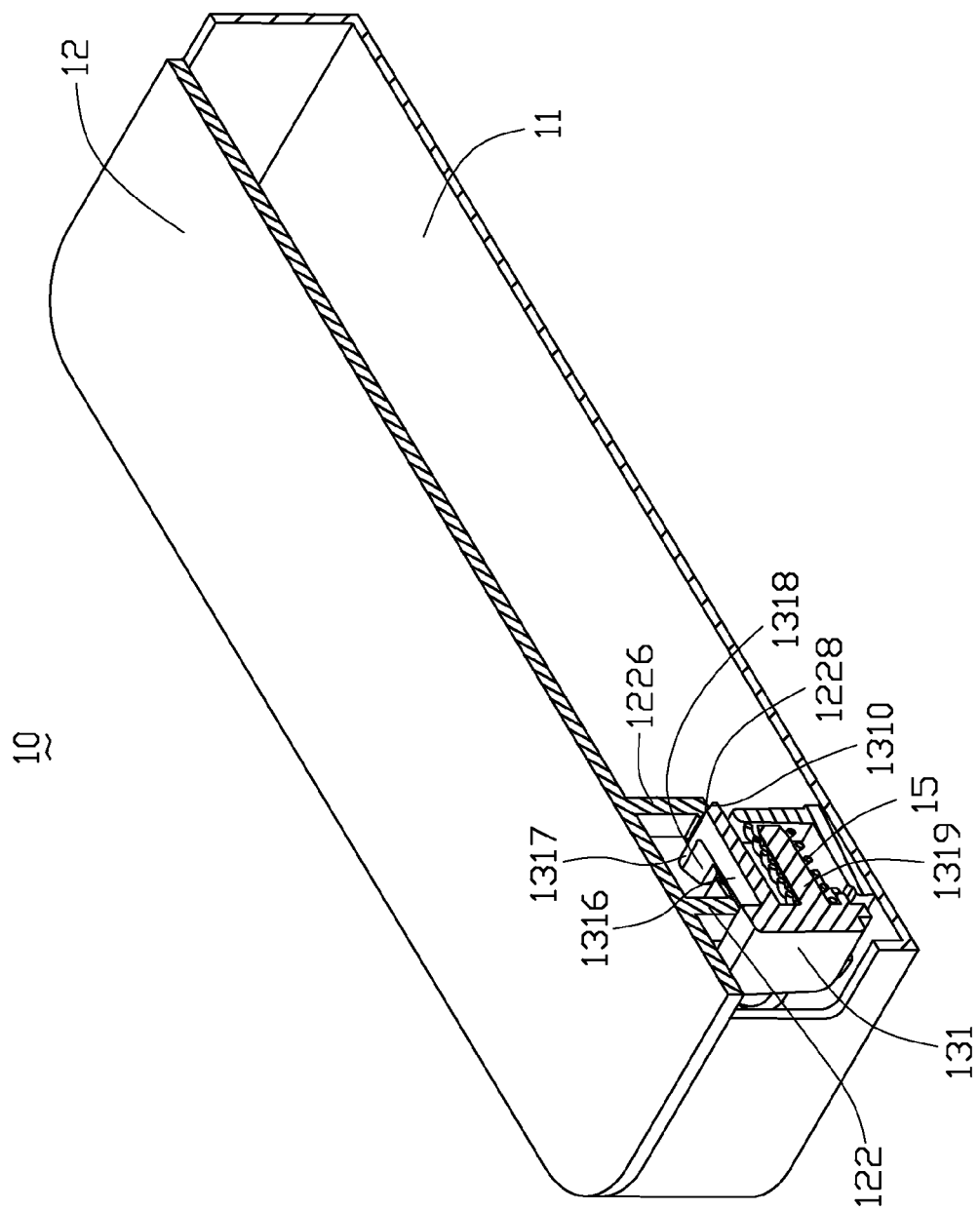
FIG. 5 is another sectional view of the battery cover latching mechanism in FIG. 4 at a released position.

Referring also to FIG. 5, when the cover member 12 needs to be detached from the housing member 11, an external force on the press portion 131 moves the press portion 131 further into the notch 116. During this stage, the clasp portions 1315 move relative to the clasp holes 145 releasing the clasp between the clasp portions 1315 and the clasp walls 146. The latch end 1317 moves relative to the first latch portion 122 at a position at which the second inclined walls 1318 contact and align with the first inclined wall 1225. The latch member 13 is in the releasing position. The return member 15 is further compressed.

By removing the external force from the latch member 13, the compression force of return member 15 returns the latch member to its original position. When the latch member 13 returns towards its original position, the second inclined walls 1318 slide along the first inclined wall 1225. Thus, the latching of the latch end 1317 and the first latch portion 122 is released. The second latch portion 1316 lifts the first latch portion 122. The cover member 12 accordingly detaches from the housing member 11.

The latch member 13 can also be pressed until the fourth inclined wall 1310 contacts the third inclined wall 1228. The latching of the latch end 1318 and the first latch portion 122 is released. The fourth inclined wall 1310 can slide along the third inclined wall 1228 by further pressing the latch member 13. Thus, the second latch portion 1316 lifts the release portion 1226. The cover member 12 accordingly detaches from the housing member 11.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching mechanism, comprising:
   a cover member comprising a first latch portion, retaining portions, and a release portion;
   a housing member mating with the cover member and comprising retaining blocks;
   a latch base securely attached to the housing member;
   a latch member mounted on the latch base and movable relative to the latch base to latch the cover member to the housing member, the latch member comprising a second latch portion; and
   a return member decompressed and the retaining portions engaging with the retaining blocks when the cover member is latched to the housing member, the latching member moving between a movable position, detaching the engagement of the first latch portion and the second latch portion, and a non-movable position, the return member configured to bias the latch member toward the non-movable position;
   wherein the first latch portion is latched to the second latch portion when the cover member is latched to the housing member, during pushing of the latch member into the housing member, the cover member can be detached from the housing member either by a movement of the latch member driven by a releasing of the compressed return member and the resisting of the second latch portion against the first latch portion; or by another movement of the latch member to further compress the return member, during which the latch member moves towards the release portion and the release portion releases the cover member from the housing member;
   wherein, the either movement of the latch member is applied, the cover member is then slid so as to disengage the retaining portions from the retaining blocks, detaching the cover member from the housing member.

2. The battery cover latching mechanism as claimed in claim 1, wherein the latch member further comprises a clasp portion, the clasp portion configured for clasping the latch member to the latch base.

3. The battery cover latching mechanism as claimed in claim 2, wherein the return member is a coil spring positioned between the latch base and the latch member, the latch member further comprises a position portion, the coil spring coiling around the position portion and compressed between the latch member and the latch base.

4. The battery cover latching mechanism as claimed in claim 3, wherein:
   the clasp portion, the second latch portion and the position portion arranged on a side of the latch member;
   the latch base defining a blind hole; and
   the coil spring received in the blind hole and compressed between the latch member and the latch base.

5. The battery cover latching mechanism as claimed in claim 1, wherein the latch base defines a clasp hole and thus forms a clasp wall, the clasp portion received in the clasp hole, movable relative to the clasp hole and clasping the clasp wall.

6. The battery cover latching mechanism as claimed in claim 5, wherein the latch base further defines a securing hole, and the housing member comprises an attaching column, the attaching column securely mounted in the securing hole.

7. The battery cover latching mechanism as claimed in claim 1, wherein:

the first latching portion comprises a first inclined wall;
the release portion comprises a third inclined wall;
the second latch portion comprises a second inclined wall facing the latch member and a fourth inclined wall opposite to the second inclined wall, the second inclined wall configured for sliding along the first inclined wall when the cover member is latched to or detached from the housing member, and the fourth inclined wall can slide along the third inclined wall when the cover member is detached from the housing member.

8. The battery cover latching mechanism as claimed in claim 7, wherein the second latch portion is configured for being driven by the return member, the second latch portion is driven to lift the first latching portion and detach the cover member away from the housing member.

9. The battery cover latching mechanism as claimed in claim 8, wherein the first latching portion comprises two latch parts and a bridge part, two opposite ends of the bridge parts connect the two latch parts respectively, the two latch parts configured for latching the second latching portion, and the first inclined wall is arranged on the two latch parts.

10. A portable electronic device, comprising:
  a cover comprising a first latch portion, retaining portions, and a release portion;
  a housing mating with the cover and comprising retaining blocks;
  a battery cover latching mechanism, comprising:
    a latch base securely attached to the housing;
    a latch member mounted on the latch base and movable relative to the latch base to latch the cover to the housing, the latch member comprising a second latch portion; and
    a return member decompressed and the retaining portions engaging with the retaining blocks when the cover member is latched to the housing member, the latching member moving between a movable position, detaching the engagement of the first latch portion and the second latch portion, and a non-movable position, the return member configured to bias the latch member toward the non-movable position;
  wherein the first latch portion is latched to the second latch portion when the cover is latched to the housing, during pushing of the latch member into the housing member, the cover can be detached from the housing either by a movement of the latch member driven by a releasing of the compressed return member and the resisting of the second latch portion against the first latch portion; or by another movement of the latch member to further compress the return member, during which the latch member moves towards the release portion and the release portion releases the cover member from the housing member;
  wherein, the either movement of the latch member is applied, the cover is then slid so as to disengage the retaining portions from the retaining blocks, detaching the cover from the housing member.

11. The portable electronic device as claimed in claim 10, wherein the latch member further comprises a clasp portion, the clasp portion configured for clasping the latch member to the latch base.

12. The portable electronic device as claimed in claim 11, wherein the return member is a coil spring positioned between the latch base and the latch member, the latch member further comprises a position portion, the coil spring coiling around the position portion and compressed between the latch member and the latch base.

13. The portable electronic device as claimed in claim 12, wherein:
  the clasp portion, the second latch portion and the position portion are arranged on a side of the latch member;
  the latch base defining a blind hole; and
  the coil spring received in the blind hole and compressed between the latch member and the latch base.

14. The portable electronic device as claimed in claim 10, wherein the latch base defines a clasp hole and thus forms a clasp wall, the clasp portion received in the clasp hole, movable relative to the clasp hole and clasping the clasp wall.

15. The portable electronic device as claimed in claim 14, wherein the latch base further defines a securing hole, and the housing comprises an attaching column, the attaching column securely mounted in the securing hole.

16. The portable electronic device as claimed in claim 10, wherein:
  the first latching portion comprises a first inclined wall;
  the release portion comprises a third inclined wall;
  the second latch portion comprises a second inclined wall facing the latch member and a fourth inclined wall opposite to the second inclined wall, the second inclined wall configured for sliding along the first inclined wall when the cover is latched to or detached from the housing, and the fourth inclined wall can slide along the third inclined wall when the cover is detached from the housing.

17. The portable electronic device as claimed in claim 16, wherein the second latch portion is configured for being driven by the return member, the second latch portion is driven to lift the first latching portion and detach the cover away from the housing.

18. The portable electronic device as claimed in claim 17, wherein the first latching portion comprises two latch parts and a bridge part, two opposite ends of the bridge parts connect the two latch parts respectively, the two latch parts configured for latching the second latching portion, and the first inclined wall is arranged on the two latch parts.

* * * * *